United States Patent
Pieratt

(10) Patent No.: US 11,894,606 B1
(45) Date of Patent: *Feb. 6, 2024

(54) BROADBAND RADOME STRUCTURE

(71) Applicant: GENERAL ATOMICS AERONAUTICAL SYSTEMS, INC., San Diego, CA (US)

(72) Inventor: Matthew W. Pieratt, Fallbrook, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,517

(22) Filed: Mar. 9, 2023

Related U.S. Application Data

(63) Continuation of application No. 16/691,282, filed on Nov. 21, 2019, now Pat. No. 11,621,484.

(51) Int. Cl.
| | |
|---|---|
| *H01Q 1/28* | (2006.01) |
| *H01Q 1/42* | (2006.01) |
| *B32B 5/26* | (2006.01) |
| *B32B 5/02* | (2006.01) |
| *B29C 70/30* | (2006.01) |

(Continued)

(52) U.S. Cl.
CPC ............ *H01Q 1/424* (2013.01); *B29C 70/30* (2013.01); *B32B 5/024* (2013.01); *B32B 5/18* (2013.01); *B32B 5/245* (2013.01); *B32B 5/26* (2013.01); *H01Q 1/421* (2013.01); *H01Q 1/422* (2013.01); *H01Q 9/0485* (2013.01); *B29K 2101/12* (2013.01); *B29K 2105/165* (2013.01); *B29L 2031/3076* (2013.01);

(Continued)

(58) Field of Classification Search
CPC .. H01Q 1/22; H01Q 1/28; H01Q 1/42; H01Q 1/50; H01Q 1/422; H01Q 1/424
See application file for complete search history.

(56) References Cited

U.S. PATENT DOCUMENTS

| | | |
|---|---|---|
| 5,408,244 A | 4/1995 | Mackenzie |
| 7,420,523 B1 | 9/2008 | Ziolkowski |

(Continued)

OTHER PUBLICATIONS

Pieratt; U.S. Appl. No. 16/691,282, filed Nov. 21, 2019.

(Continued)

*Primary Examiner* — Tung X Le
(74) *Attorney, Agent, or Firm* — Fitch, Even, Tabin & Flannery LLP

(57) ABSTRACT

A radome structure for a multilayered broadband radome structure is described. The radome structure may include a central core layer comprising a first dielectric constant, an interior intermediate core layer adjacent to an interior side of the central core layer, comprising a second dielectric constant less than the first dielectric constant, an exterior intermediate core layer adjacent to an exterior side of the central core layer, comprising a third dielectric constant less than the first dielectric constant, and an interior outside core layer adjacent to an interior side of the interior intermediate core layer, comprising a fourth dielectric constant less than the second dielectric constant. In some examples of the radome structure described above may further include an exterior outside core layer adjacent to an exterior side of the exterior intermediate core layer, comprising a low dielectric constant.

28 Claims, 9 Drawing Sheets

(51) Int. Cl.
   *B32B 5/18*   (2006.01)
   *B32B 5/24*   (2006.01)
   *H01Q 9/04*   (2006.01)
   *B29K 101/12*   (2006.01)
   *B29K 105/16*   (2006.01)
   *B29L 31/34*   (2006.01)
   *B29L 31/30*   (2006.01)

(52) U.S. Cl.
   CPC ... *B29L 2031/3456* (2013.01); *B32B 2457/00* (2013.01); *B32B 2605/18* (2013.01); *H01Q 1/28* (2013.01)

(56) References Cited

U.S. PATENT DOCUMENTS

| | | | |
|---|---|---|---|
| 7,463,212 B1 | 12/2008 | Ziolkowski | |
| 8,917,220 B2 | 12/2014 | Ziolkowski | |
| 9,099,782 B2 | 8/2015 | Ziolkowski | |
| 9,123,998 B1 * | 9/2015 | LoRe | H01Q 1/422 |
| 11,095,025 B2 * | 8/2021 | Adugna | H01Q 1/28 |
| 11,621,484 B1 | 4/2023 | Pieratt | |
| 2011/0050370 A1 | 3/2011 | Lee | |
| 2012/0188145 A1 | 7/2012 | Sato | |
| 2013/0321236 A1 * | 12/2013 | Ziolkowski | H01Q 1/424 343/872 |
| 2016/0172745 A1 | 6/2016 | Keen | |
| 2016/0172748 A1 | 6/2016 | Keen | |
| 2018/0090851 A1 | 3/2018 | Feldman | |
| 2020/0212556 A1 * | 7/2020 | Moore | H01Q 1/421 |

OTHER PUBLICATIONS

USPTO; Non-Final Office Action issued in U.S. Appl. No. 16/691,282 dated Jun. 8, 2022.

USPTO; Notice of Allowance issued in U.S. Appl. No. 16/691,282 dated Dec. 5, 2022.

* cited by examiner

BROADBAND RADOME STRUCTURE

This application is a continuation of U.S. application Ser. No. 16/691,282, filed Nov. 21, 2019, for BROADBAND RADOME STRUCTURE, which is incorporated in its entirety herein by reference.

BACKGROUND OF THE INVENTION

1. Field of the Invention

The present invention relates generally to radome structures, and more specifically to multilayered broadband radome structures.

2. Discussion of the Related Art

A radome is a structural, weatherproof enclosure that protects a radar antenna (i.e., for object or weather detection) by definition, but the term also applies to antennas in general. Radomes may protect the antenna from the external environment and conceal electronic equipment from view. A radome may be constructed of material that does not substantially interfere with electromagnetic signals transmitted or received by the enclosed antenna.

Radomes can be constructed in a variety of shapes depending on the particular application, using various construction materials such as fiberglass, astroquazrtz, and other materials. In some cases, radomes may be located on aircraft. Such cases may require additional protection, such as aero-loading, durability, and birdstrike.

In some cases, increasing the structural integrity of the radome compromises the performance of the enclosed antenna across at least a portion of the electromagnetic spectrum. Electromagnetic degradation due to the radome may result in increased transmission loss, reflections, absorption, axial ratio, and so forth, over a specified frequency range and angles of incident. Prior art for A-Sandwich and C-Sandwich multilayered designs may be suitable for frequency bands at or below Ku-band, but often not suitable at or above K-band, due to thin layering required (the layers scale in proportion to the wavelength). The thin layers may not meet the structural and environmental requirements. Consequently, the D-Sandwich of U.S. Pat. No. 5,408,244 and the B-sandwich designs of U.S. Pat. Nos. 7,420,523 and 8,917,220 addressed the challenge of meeting electromagnetic requirements at frequencies at or above K-band as well as broadband performance. However, improvements are needed in environmental considerations, weight, and electromagnetic performance. Therefore, there is a need in the art for robust radome construction that allows for improved operation of the antenna compared with existing radome designs, over a broad frequency band and angles of incidence.

SUMMARY

A radome structure for a multilayered broadband radome structure is described. The radome structure may include a central core layer comprising a first dielectric constant, an interior intermediate core layer adjacent to an interior side of the central core layer, comprising a second dielectric constant less than the first dielectric constant, an exterior intermediate core layer adjacent to an exterior side of the central core layer, comprising a third dielectric constant less than the first dielectric constant, and an interior outside core layer adjacent to an interior side of the interior intermediate core layer, comprising a fourth dielectric constant less than the second dielectric constant.

A method of manufacturing a radome structure is described. The method may include providing a central core layer comprising a first dielectric constant, providing an interior intermediate core layer adjacent to an interior side of the central core layer, comprising a second dielectric constant less than the first dielectric constant, providing an exterior intermediate core layer adjacent to an exterior side of the central core layer, comprising a third dielectric constant less than the first dielectric constant, and providing an interior outside core layer adjacent to an interior side of the interior intermediate core layer, comprising a fourth dielectric constant less than the second dielectric constant.

In some examples of the radome structure and method described above, the central core layer and interior intermediate core layer comprise woven fiber cloth impregnated with a matrix binder. In some examples of the radome structure and method described above, the woven fiber cloth is selected from the group consisting of Astroquartz, E-glass, S-glass, polyethylene, polyamide fibers and combinations thereof. In some examples of the radome structure and method described above, the matrix binder is selected from the group consisting of cyanate ester, epoxy, vinyl ester, polyester, and combinations thereof.

In some examples of the radome structure and method described above, the interior outside core layer comprises syntactic foam formulated with a mixture of microballoons and fillers embedded in a thermoset or thermoplastic matrix binder to achieve the fourth dielectric constant, and a thickness.

In some examples of the radome structure and method described above, the central core layer comprises syntactic foam formulated with a mixture of microballoons and fillers embedded in a thermoset or thermoplastic matrix binder to achieve the first dielectric constant, and a thickness. In some examples of the radome structure and method described above, the interior intermediate core layer comprises syntactic foam formulated with a mixture of microballoons and fillers embedded in said matrix binder to achieve the second dielectric constant, and wherein the exterior intermediate core layer comprises syntactic foam formulated with a mixture of microballoons and fillers embedded in said matrix binder to achieve the third dielectric constant.

In some examples of the radome structure and method described above, the central core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance. In some examples of the radome structure and method described above, the interior intermediate core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance. In some examples of the radome structure and method described above, the exterior intermediate core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance.

In some examples of the radome structure and method described above, said central core layer comprises a dielectric constant of from about 3.5 to 8.5; said interior intermediate core layer comprises a dielectric constant of from about 2.5 to 4.5; said exterior intermediate core layer comprises a dielectric constant of from about 2.5 to 4.5; and said interior outside core layer comprises a dielectric constant of from about 1.5 to 2.5.

Some examples of the radome structure and method described above may further include an environmental coating on an exterior surface of the radome structure. Some examples of the radome structure and method described above may further include a protective coating on an interior surface of the radome structure.

Some examples of the radome structure and method described above may further include an exterior outside core layer adjacent to an exterior side of the exterior intermediate core layer, comprising a low dielectric constant.

In some examples of the radome structure and method described above, the exterior outside core layer has a dielectric constant of from about 1.5 to 2.5.

In some examples of the radome structure and method described above, the interior outside core layer comprises syntactic foam formulated with a mixture of microballoons and fillers embedded in a thermoset or thermoplastic matrix binder to achieve a prescribed dielectric constant and thickness.

In some examples of the radome structure and method described above, the interior outside core layer comprises a thickness of at least 0.02" and no more than 0.5". In some examples of the radome structure and method described above, the exterior outside core layer comprises a thickness of at least 0.02" and no more than 0.5". In some examples of the radome structure and method described above, the interior intermediate core layer comprises a thickness of at least 0.005" and no more than 0.5". In some examples of the radome structure and method described above, the exterior intermediate core layer comprises a thickness of at least 0.005" and no more than 0.5". In some examples of the radome structure and method described above, the central core layer comprises a thickness of at least 0.005" and no more than 0.5".

In some examples of the radome structure and method described above, the fourth dielectric constant and the fifth dielectric constant are equal. In some examples of the radome structure and method described above, the second dielectric constant and the third dielectric constant are equal.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
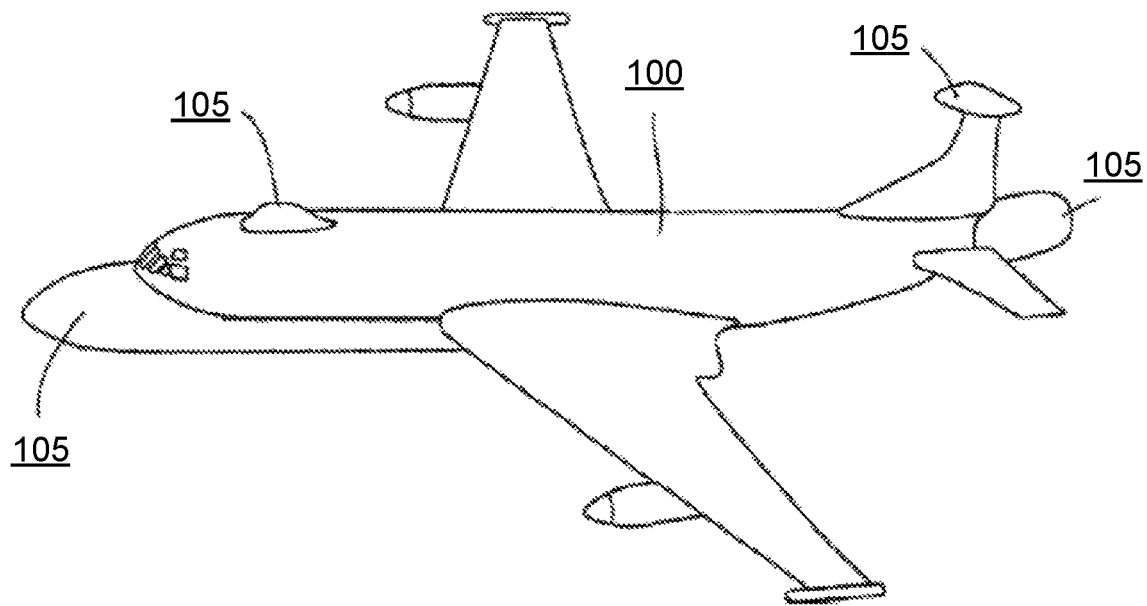
FIG. 1 shows an example of several possible radome locations on an aircraft in accordance with aspects of the present disclosure.

FIG. 1 shows an example of several possible radome locations 105 (e.g., aircraft nose, fuselage top, vertical stabilizer top, and tail end) on an aircraft 100 in accordance with aspects of the present disclosure. That is, aircraft 100 may include several possible locations where a radome location 105 may be used to protect an antenna or radar array.

Figure 2:
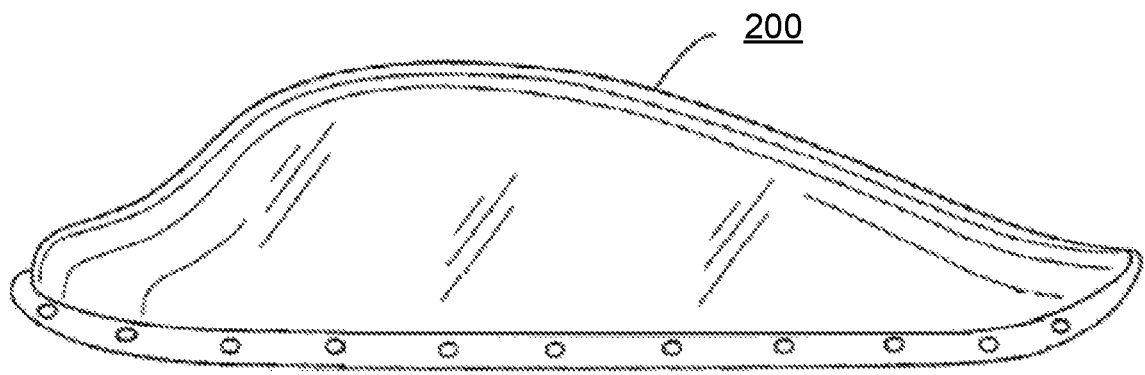
FIG. 2 shows an example of a radome in accordance with aspects of the present disclosure.

FIG. 2 shows an example of a radome 200 in accordance with aspects of the present disclosure. For example, radome 200 may represent a radome on the top surface of an aircraft as depicted in FIG. 1. The radome is generally convex relative to a skin of the aircraft, attaching at its edges to the skin of the aircraft and forming a space between the skin of the aircraft and a concave interior of the radome. A radome may also include flat surfaces, such as a windowed area along a flat or curved side of the fuselage. The space is generally used to contain one or more antennas, sealing out environmental elements, such as wind, rain, ice and snow, while allowing radio frequency signals to enter and exit the radome from the antenna(s). In this way the antenna(s) is(are) protected from the elements while functioning as antennas for communications transmitters, receivers, transceivers, radars, and the like, onboard the aircraft.

Figure 3:
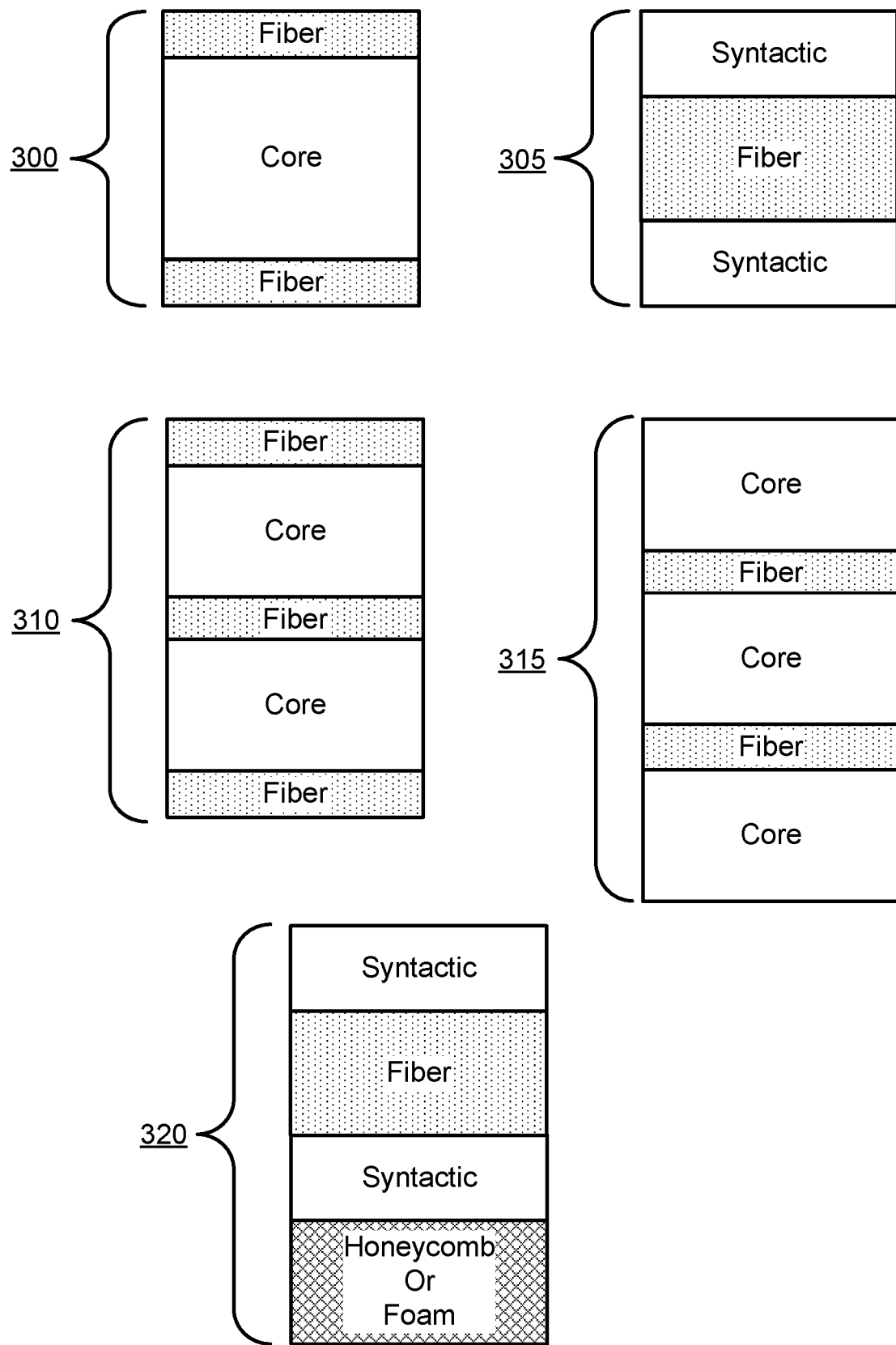
FIG. 3 shows an example of several radome structures in accordance with aspects of the present disclosure.

FIG. 3 shows an example of several radome structures in accordance with aspects of the present disclosure. The examples shown include first radome structure 300, second radome structure 305, third radome structure 310, fourth radome structure 315, and fifth radome structure 320.

The first radome structure 300 (the "A-Sandwich") may include a core surrounded by two fiber layers. The second radome structure 305 (the "B-Sandwich", U.S. Pat. No. 7,420,523 B1) may include a fiber layer surrounded by two syntactic layers. The third radome structure 310 (the "C-Sandwich") may include two core layers with three fiber layers. The fourth radome structure 315 (the "D-Sandwich", U.S. Pat. No. 5,408,244) may include three core layers separated by two fiber layers. The fifth radome structure 320 (the "Modified B-Sandwich", U.S. Pat. No. 8,917,220 B2) may include a fiber layer surrounded by two syntactic layers, and an interior honeycomb or foam layer.

Conventional radomes may use the A and C "sandwich" designs. Astroquartz or glass layers may protect the relatively fragile honeycomb layer(s). The B-sandwich has a lower dielectric on the outside, providing a better "dielectric match" to air as the RF energy transitions through the dielectric materials, but environmentally not tenable using honeycomb or foam. Rather, syntactic foam is used on the exterior because syntactic foam is more environmentally durable than honeycomb or foam, though not as durable as Astroquartz or glass. This material has a dielectric constant that is lower than Astroquartz and glass but higher than honeycomb or foam.

Like the B-sandwich, the "D-sandwich" provides broadband performance, but incorporates tailoring of the outer core layers and central core layer to about one half the dielectric of the intermediate layers. The intermediate layers have a dielectric constant of ~3.5-8 (potentially quartz or glass fiber) and are relatively thin (0.005"-0.02"), while the exterior core and center core have a dielectric constant of ~2-3.5 (potentially teflon or quartz fiber) and relatively thick (0.01"-0.1"). One benefit of this design is that the materials have substantially more structural rigidity than honeycomb or foam and the electromagnetic energy transitions better from air to the core layers and back to air, improving the broadband performance.

The B-sandwich may be modified by substantially increasing the thickness of the quartz or glass fiber layers (10-30 plies, ~0.01"/ply), rather than the typical 1 or 2 plies for an A or C-sandwich, for the center core. For the outside core, a syntactic foam (gas-filled microspheres) was proposed, which with the lower dielectric constant, can better transition from air to the structural quartz or glass fiber and back to air. This design provides excellent Ka performance, though it can be tailored to other frequency bands. In a "modified B-sandwich", the B-sandwich is modified with another dielectric transitioning material applied to the interior surface that is an even closer match to air: foam or honeycomb. Thus, the stack is syntactic foam—fiber (glass/quartz)—syntactic foam—honeycomb/foam, which provides excellent Ku to Ka performance.

Figure 4:
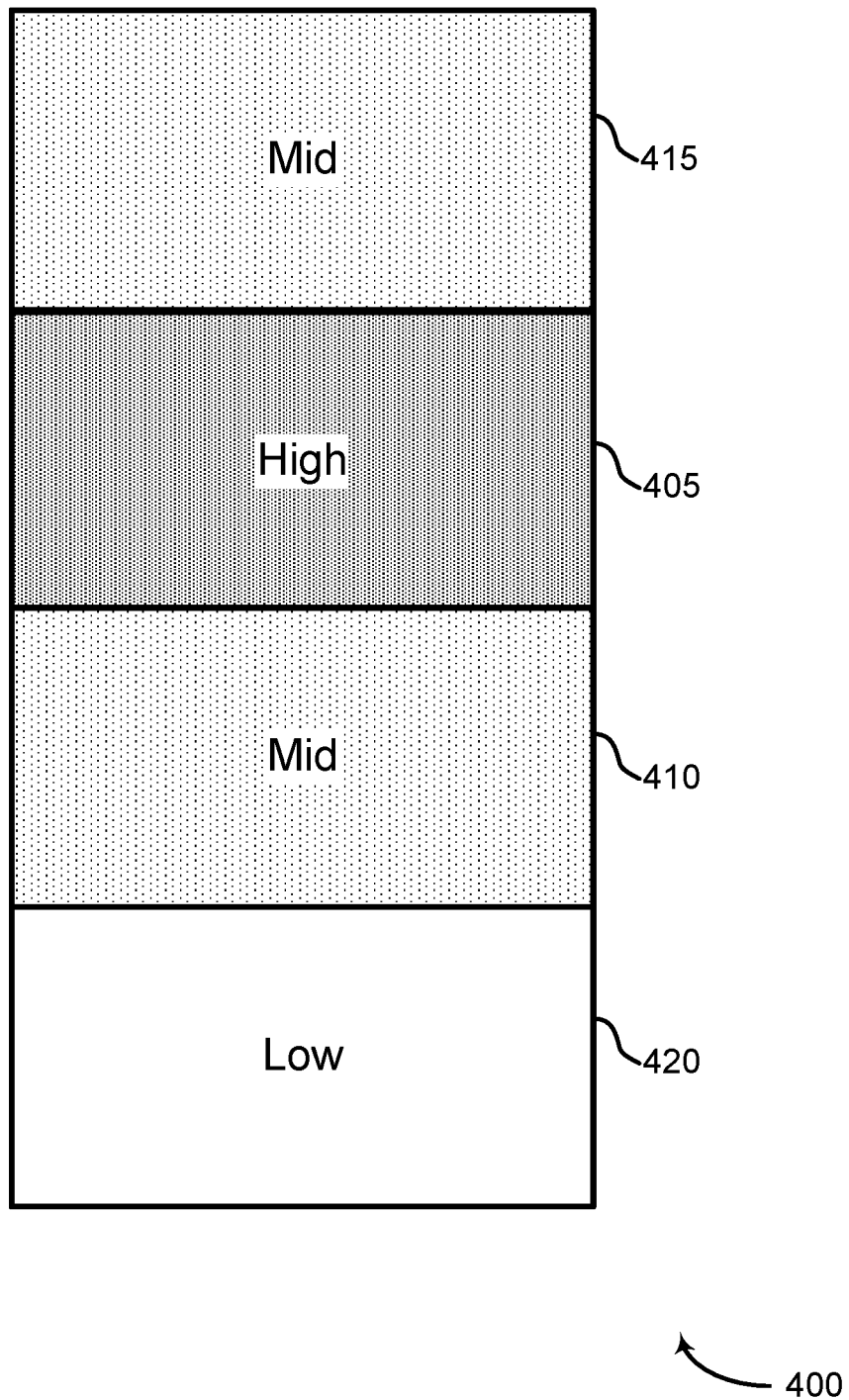
FIGS. 4 through 6 show examples of a radome structure in accordance with aspects of the present disclosure.
Figure 5:
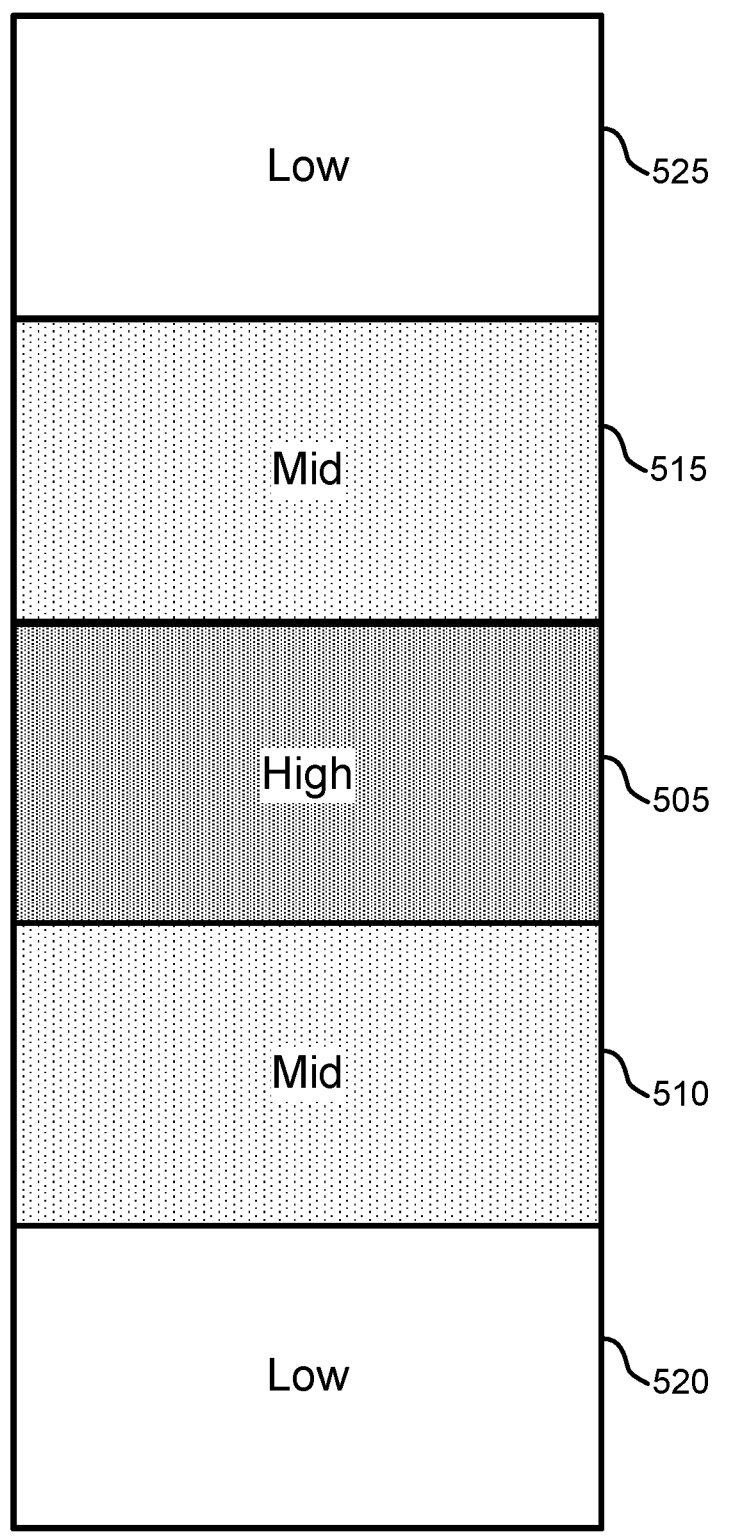
Figure 6:
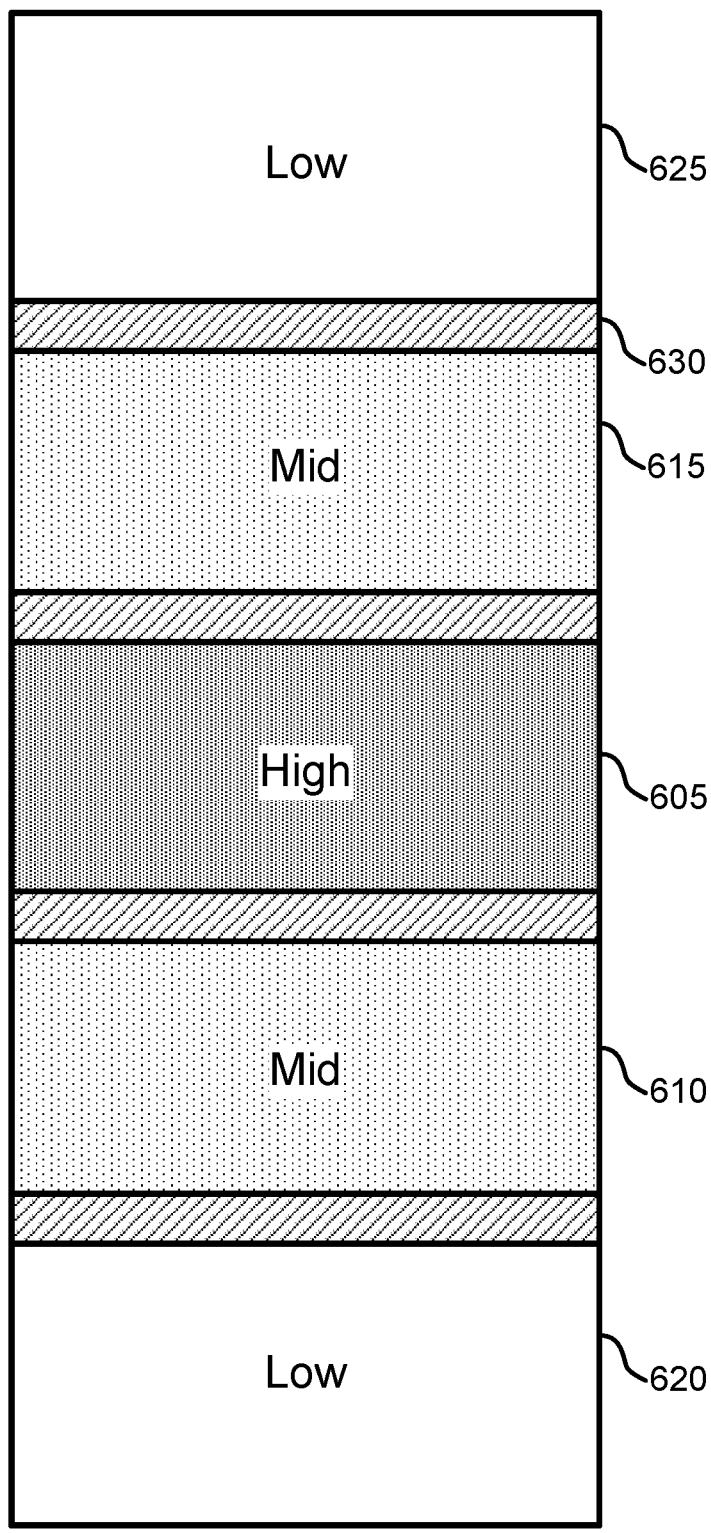

Referring to FIGS. 4-6, several additional radome structures are described. Radome structure 400 may differ from the radome structures of FIG. 3 in that the D-sandwich alternates between high and low dielectric constants, whereas radome structures of FIGS. 4-6 enable gradually transitioning the dielectric constant from low to high to low (i.e., not alternating the dielectric). Furthermore, the D-sandwich has thin intermediate layers, 0.005-0.02", whereas radome structure 400 may be thicker, depending on the frequency band(s) of interest.

The B-sandwich typically uses syntactic foam and quartz or syntactic foam and glass combination, and the modified B-sandwich uses the aforementioned design and adds a foam or honeycomb layer on the interior surface. However, the radome structures of FIGS. 4-6 may use, for example, syntactic-quartz-glass-quartz-syntactic for a potentially thinner and lighter design with a comparable electromagnetic performance.

Finally, the designs set forth in FIG. 3 have specific materials and thickness call outs that are specific to their application, which differ from those of the radome structures of FIGS. 4-6. Therefore, the radome structures of FIGS. 4-6 may provide improved electromagnetic performance, durability and/or structural rigidity over the designs set forth in FIG. 3.

FIG. 4 shows an example of a radome structure 400 in accordance with aspects of the present disclosure. Radome structure 400 may include aspects of the corresponding element or elements described with reference to FIGS. 5-6. In one embodiment, radome structure 400 may be optimized for Ka band performance.

According to the present disclosure, a radome structure 400 may comprise a multilayered laminate construction composed of 1 or 2 outer core layers (i.e., interior outside and/or exterior outside layers), 2 intermediate core layers, and a central core layer.

A dielectric constant for the outer layers may range from about 1.5-2.5 and may be made of syntactic film or dense foam layer, otherwise known as "LOW" dielectric. A dielectric constant for the intermediate layers may range from about 2.5-4.5 and may be made of, for example, quartz or S-glass fiber, otherwise known as "MID" dielectric. A dielectric constant for the center core layer may range from about 3.5-8 and may be made of S or E-glass, otherwise known as "HIGH" dielectric.

In some cases, a thin (0.002"-0.008") environmental seal or paint and primer may be applied to the exterior surface of the radome. In some cases, a thin (0.001"-0.003") protective seal or hydrophobic coating may be applied to the interior surface of the radome to prevent moisture absorption and/or accumulation on the surface.

Radome structure 400 may include central core layer 405, interior intermediate core layer 410, exterior intermediate core layer 415, and interior outside core layer 420. In some cases, radome structure 400 may include an environmental coating on an exterior surface (not shown). In some cases, radome structure 400 may include a protective coating on an interior surface (also not shown).

Central core layer 405 may include a first dielectric constant. In some examples, the central core layer 405 includes syntactic foam formulated with a mixture of microballoons and fillers embedded in a thermoset or thermoplastic matrix binder to achieve the first dielectric constant, and a thickness. In some examples, the central core layer 405 includes a thin layer of dielectrically matched woven fiber and matrix binder juxtaposed with the syntactic foam, where the woven fiber and matrix binder form a barrier between one or more syntactic layers to achieve a tailored balance of structural reinforcement and tuned electromagnetic performance. In some examples, the central core layer 405 includes a thickness of at least 0.005" and no more than 0.5".

Central core layer 405 may include a first dielectric constant. In some examples, the central core layer 405 and intermediate core layers include woven fiber cloth impregnated with a matrix binder. In some examples, the woven fiber cloth is selected from the group consisting of Astroquartz, E-glass, S-glass, polyethylene, polyamide fibers and combinations thereof. In some examples, the matrix binder is selected from the group consisting of cyanate ester, epoxy, vinyl ester, polyester, and combinations thereof.

Central core layer 405 may include aspects of the corresponding element or elements described with reference to FIGS. 5-6.

Interior intermediate core layer 410 may be adjacent to an interior side of the central core layer 405, comprising a second dielectric constant less than the first dielectric constant. In some examples, the central core layer 405 and interior intermediate core layer 410 include woven fiber cloth impregnated with a matrix binder. In some examples, the woven fiber cloth is selected from the group consisting of Astroquartz, E-glass, S-glass, polyethylene, polyamide fibers and combinations thereof. In some examples, the matrix binder is selected from the group consisting of cyanate ester, epoxy, vinyl ester, polyester, and combinations thereof.

In some examples, the interior intermediate core layer 410 includes syntactic foam formulated with a mixture of microballoons and fillers embedded in a thermoset or thermoplastic matrix binder to achieve the second dielectric constant. In some examples, the interior intermediate core layer 410 includes a thin layer of dielectrically matched woven fiber and matrix binder juxtaposed with the syntactic foam, where the woven fiber and matrix binder form a barrier between one or more syntactic layers to achieve a tailored balance of structural reinforcement and tuned electromagnetic performance. In some examples, the interior intermediate core layer 410 includes a thickness of at least 0.005" and no more than 0.5".

Interior intermediate core layer 410 may be adjacent to an interior side of the central core layer 405, comprising a dielectric constant of from 2.5 to 4.5.

Interior intermediate core layer 410 may include aspects of the corresponding element or elements described with reference to FIGS. 5 and 6.

Exterior intermediate core layer 415 may be adjacent to an exterior side of the central core layer 405, comprising a third dielectric constant less than the first dielectric constant. In some examples, the central core layer 405 and exterior intermediate core layer 415 include woven fiber cloth impregnated with a matrix binder. In some examples, the woven fiber cloth is selected from the group consisting of Astroquartz, E-glass, S-glass, polyethylene, polyamide fibers and combinations thereof. In some examples, the matrix binder is selected from the group consisting of cyanate ester, epoxy, vinyl ester, polyester, and combinations thereof.

In some examples, the exterior intermediate core layer 415 includes syntactic foam formulated with a mixture of microballoons and fillers embedded in a thermoset or thermoplastic matrix binder to achieve the third dielectric constant. In some examples, the exterior intermediate core layer 415 includes a thin layer of dielectrically matched woven fiber and matrix binder juxtaposed with the syntactic foam, where the woven fiber and matrix binder form a barrier between one or more syntactic layers to achieve a tailored balance of structural reinforcement and tuned electromagnetic performance. In some examples, the exterior intermediate core layer 415 includes a thickness of at least 0.005" and no more than 0.5".

Exterior intermediate core layer 415 may be adjacent to an exterior side of the central core layer 405, comprising a dielectric constant of from 2.5 to 4.5.

Exterior intermediate core layer 415 may include aspects of the corresponding element or elements described with reference to FIGS. 5 and 6.

Interior outside core layer 420 may be adjacent to an interior side of the interior intermediate core layer 410, comprising a fourth dielectric constant less than the second dielectric constant. In some examples, the interior outside core layer 420 includes syntactic foam formulated with a mixture of microballoons and fillers embedded in a thermoset or thermoplastic matrix binder to achieve the second dielectric constant, and a thickness. In some examples, the interior outside core layer 420 includes a thickness of at least 0.02" and no more than 0.5".

Interior outside core layer 420 may include aspects of the corresponding element or elements described with reference to FIGS. 5-6.

According to one embodiment optimized for K to Ka Band applications, radome structure 400 may include 0.05" to 0.08" of quartz (dielectric constant 3.0-3.3), 0.03" to 0.06" of E-glass (dielectric constant 4.3-5.0), 0.02" to 0.05" of quartz (dielectric constant 3.0-3.3), and 0.07" to 0.12" Syntactic Foam (dielectric constant 1.5-1.8), (Bag side with caul plate). The design may exhibit improved durability since there is no Syntactic Foam on the exterior, and may be suitable for withstanding impacts (hail, birdstrike, etc.). The exact frequency band(s), angles of incidence, RF performance, weight constraints, and environmental requirements will determine the exact material choices and thickness values.

FIG. 5 shows an example of a radome structure 500 in accordance with aspects of the present disclosure. Radome structure 500 may include aspects of the corresponding element or elements described with reference to FIGS. 4 and 6. In one embodiment, radome structure 500 may be optimized for KuKa band performance.

Radome structure 500 may include central core layer 505, interior intermediate core layer 510, exterior intermediate core layer 515, interior outside core layer 520, and exterior outside core layer 525.

Central core layer 505 may include aspects of the corresponding element or elements described with reference to FIGS. 4 and 6. Interior intermediate core layer 510 may include aspects of the corresponding element or elements described with reference to FIGS. 4 and 6. Exterior intermediate core layer 515 may include aspects of the corresponding element or elements described with reference to FIGS. 4 and 6. Interior outside core layer 520 may include aspects of the corresponding element or elements described with reference to FIGS. 4 and 6.

Exterior outside core layer 525 may be adjacent to an exterior side of the second exterior intermediate core layer 515, comprising a seventh dielectric constant less than the fifth dielectric constant. In some examples, the exterior outside core layer 525 has a dielectric constant of from about 1.5 to 2.5, comprising another layer of syntactic foam.

Exterior outside core layer 525 may include aspects of the corresponding element or elements described with reference to FIG. 6.

In an embodiment optimized for Ku to Ka band performance, radome structure 500 may include 0.07" to 0.12" Syntactic Foam (dielectric constant 1.5-1.8), 0.05" to 0.08" of quartz (dielectric constant 3.0-3.3), 0.04" to 0.07" of E-glass (dielectric constant 4.3-5.0), 0.05" to 0.08" of quartz (dielectric constant 3.0-3.3), and 0.07" to 0.12" Syntactic Foam (dielectric constant 1.5-1.8). The exact frequency band(s), angles of incidence, RF performance, weight constraints, and environmental requirements will determine the exact material choices and thickness values.

FIG. 6 shows an example of a radome structure 600 in accordance with aspects of the present disclosure. Radome structure 600 may include aspects of the corresponding element or elements described with reference to FIGS. 4 and 5.

Radome structure 600 may include central core layer 605, interior intermediate core layer 610, exterior intermediate core layer 615, interior outside core layer 620, exterior outside core layer 625, and one or more barrier layers 630. The barrier layers may be located between central core layer 605 and interior intermediate core layer 610 or exterior intermediate core layer 615; or between interior intermediate core layer 610 and interior outside core layer 620; or between exterior intermediate core layer 615 and exterior outside core layer 625.

Central core layer 605 may include aspects of the corresponding element or elements described with reference to FIGS. 4 and 5. Interior intermediate core layer 610 may include aspects of the corresponding element or elements described with reference to FIGS. 4 and 5. Exterior intermediate core layer 615 may include aspects of the corresponding element or elements described with reference to FIGS. 4 and 5.

Interior outside core layer 620 may include aspects of the corresponding element or elements described with reference to FIGS. 4 and 5. Exterior outside core layer 625 may include aspects of the corresponding element or elements described with reference to FIG. 5.

Figure 7:
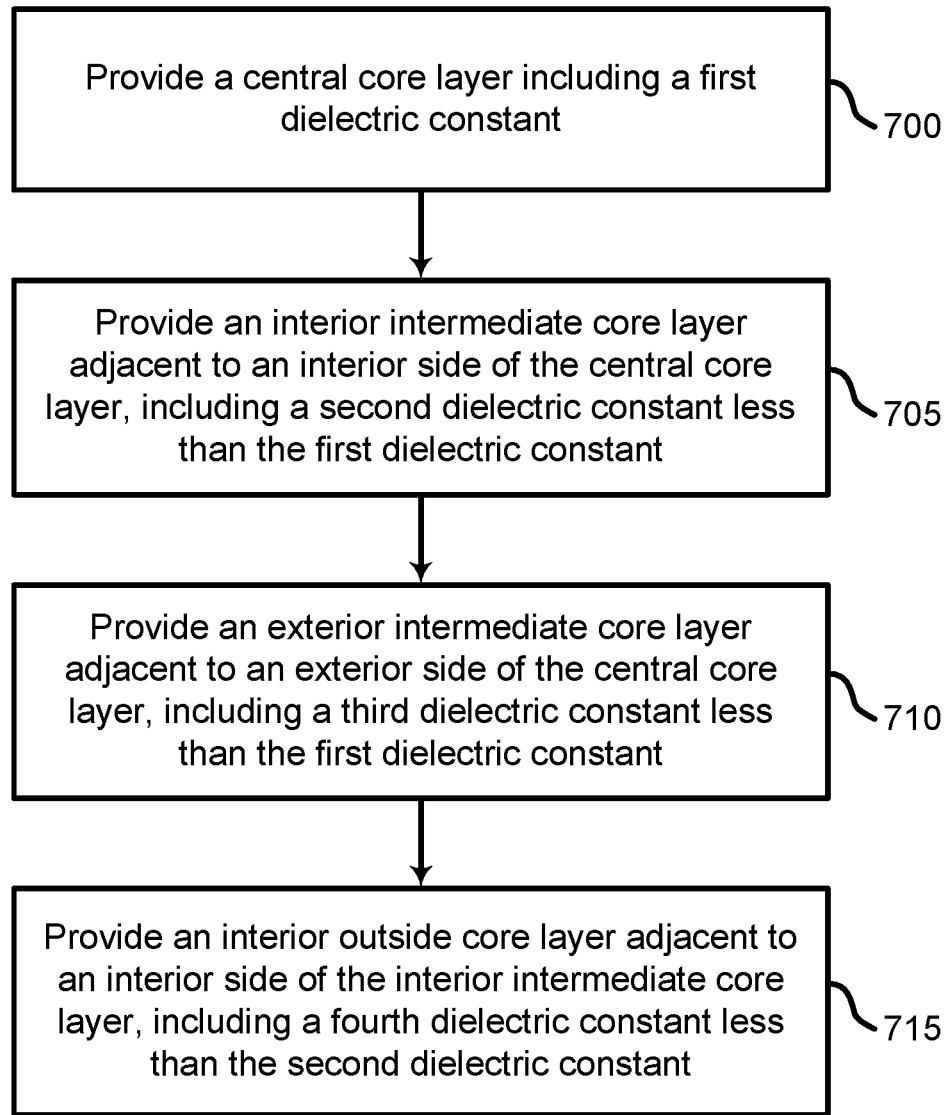
FIGS. 7 through 9 show examples of a process for manufacturing a multilayered broadband radome structure in accordance with aspects of the present disclosure.

FIG. 7 shows an example of a process for manufacturing a multilayered broadband radome structure in accordance with aspects of the present disclosure. Generally, these operations may be performed according to the methods and processes described in accordance with aspects of the present disclosure. For example, the operations may be composed of various substeps, or may be performed in conjunction with other operations described herein.

FIG. 7 shows an example of a multilayered broadband radome structure in accordance with aspects of the present disclosure. Realization of the multilayered broadband radome structure requires control of all aspects of the manufacturing process from raw materials through lamination and cure process. Physical properties of each of the individual materials must be controlled in order to achieve thickness control of each of the individual layers. Integral to the design approach described in the present disclosure, each of the unique layers of the design require compatibility of resin chemistry and compatibility of processing requirements to support manufacturing. The allowable variations in manufacturing approach for the multilayered broadband radome structure described in the present disclosure include the following:

A single stage co-cure of all layers. This single stage cure may also include intermediate processing steps to pre-consolidate the individual layers prior to the final cure as a means of achieving thickness control.

A multi-stage cure which adds layers of uncured material onto a foundation of pre-cured material in a co-bonding process. This process is repeated at intervals as required to achieve the multilayered broadband radome structure in accordance with the present disclosure A multi-stage cure process which brings a number of individually pre-cured layers of the broadband radome design together in a secondary bonding operation. The adhesive used to join the individual pre-cured layers is included in the broad band radome design At step 700, the system may provide a central core layer including a first dielectric constant. In some cases, the operations of this step may refer to a central core layer as described with reference to FIGS. 4-6.

At step 705, the system may provide an interior intermediate core layer adjacent to an interior side of the central core layer, including a second dielectric constant less than the first dielectric constant. In some cases, the operations of this step may refer to an interior intermediate core layer as described with reference to FIGS. 4-6.

At step 710, the system may provide an exterior intermediate core layer adjacent to an exterior side of the central core layer, including a third dielectric constant less than the first dielectric constant. In some cases, the operations of this step may refer to an exterior intermediate core layer as described with reference to FIGS. 4-6.

At step 715, the system may provide an interior outside core layer adjacent to an interior side of the interior intermediate core layer, including a fourth dielectric constant less than the second dielectric constant. In some cases, the operations of this step may refer to an interior outside core layer as described with reference to FIGS. 4-6.

Figure 8:
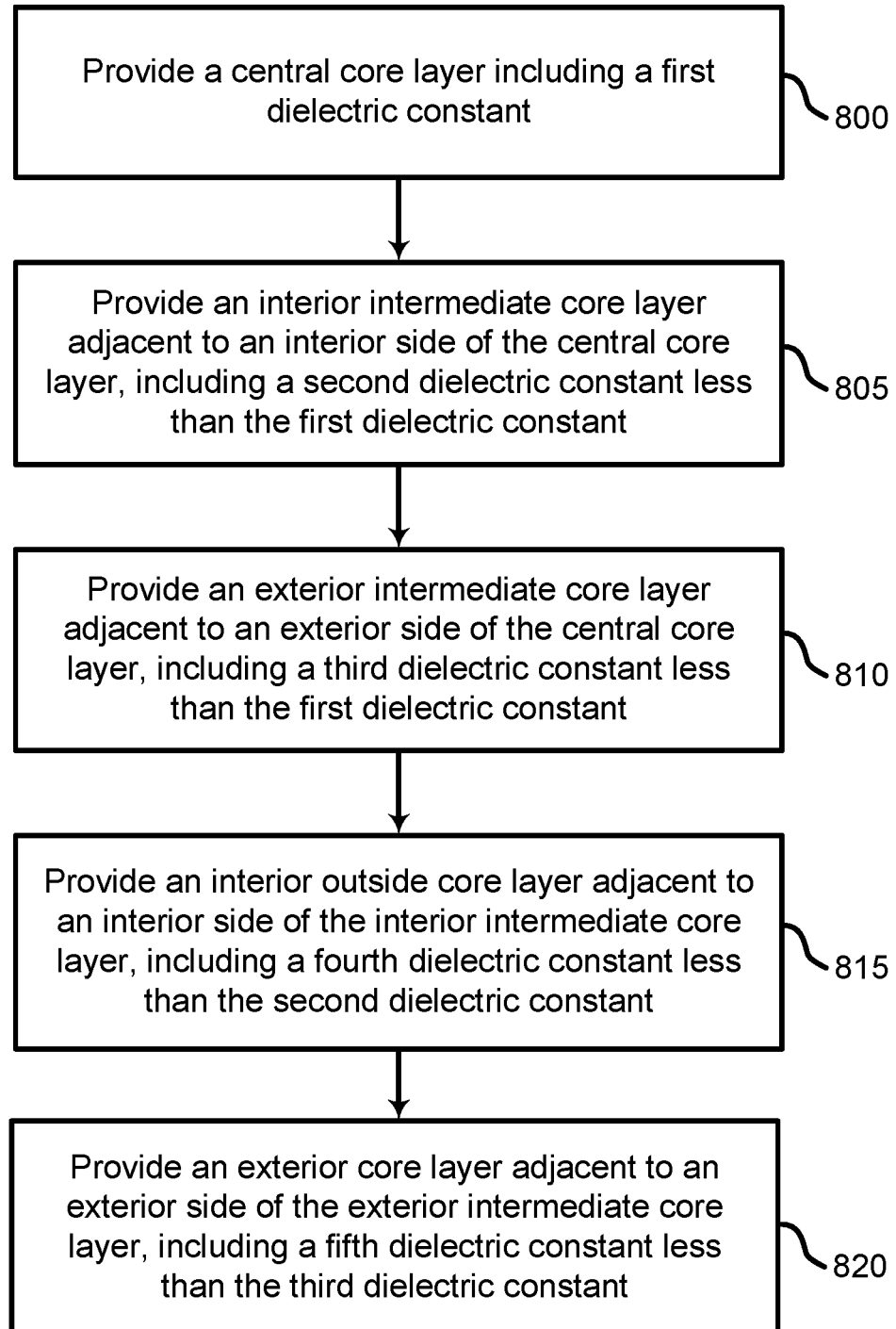

FIG. 8 shows an example of a process for manufacturing a multilayered broadband radome structure in accordance with aspects of the present disclosure. Generally, these operations may be performed according to the methods and processes described in accordance with aspects of the present disclosure. For example, the operations may be composed of various substeps, or may be performed in conjunction with other operations described herein.

FIG. 8 shows an example of a multilayered broadband radome structure in accordance with aspects of the present disclosure. Realization of the multilayered broadband radome structure requires control of all aspects of the manufacturing process from raw materials through lamination and cure process. Physical properties of each of the individual materials must be controlled in order to achieve thickness control of each of the individual layers. Integral to the design approach described in the present disclosure, each of the unique layers of the design require compatibility of resin chemistry and compatibility of processing requirements to support manufacturing. The allowable variations in manufacturing approach for the multilayered broadband radome structure described in the present disclosure include the following:

A single stage co-cure of all layers. This single stage cure may also include intermediate processing steps to pre-consolidate the individual layers prior to the final cure as a means of achieving thickness control.

A multi-stage cure which adds layers of uncured material onto a foundation of pre-cured material in a co-bonding process. This process is repeated at intervals as required to achieve the multilayered broadband radome structure in accordance with the present disclosure A multi-stage cure process which brings a number of individually pre-cured layers of the broadband radome design together in a secondary bonding operation. The adhesive used to join the individual pre-cured layers is included in the broad band radome design At step 800, the system may provide a central core layer including a first dielectric constant. In some cases, the operations of this step may refer to a central core layer as described with reference to FIGS. 4-6.

At step 805, the system may provide an interior intermediate core layer adjacent to an interior side of the central core layer, including a second dielectric constant less than the first dielectric constant. In some cases, the operations of this step may refer to an interior intermediate core layer as described with reference to FIGS. 4-6.

At step 810, the system may provide an exterior intermediate core layer adjacent to an exterior side of the central core layer, including a third dielectric constant less than the first dielectric constant. In some cases, the operations of this step may refer to an exterior intermediate core layer as described with reference to FIGS. 4-6.

At step 815, the system may provide an interior outside core layer adjacent to an interior side of the interior intermediate core layer, including a fourth dielectric constant less than the second dielectric constant. In some cases, the operations of this step may refer to an interior outside core layer as described with reference to FIGS. 4-6.

At step 820, the system may provide an exterior outside core layer adjacent to an exterior side of the exterior intermediate core layer, including a fifth dielectric constant less than the third dielectric constant. In some cases, the operations of this step may refer to an interior outside core layer as described with reference to FIGS. 4-6.

Figure 9:
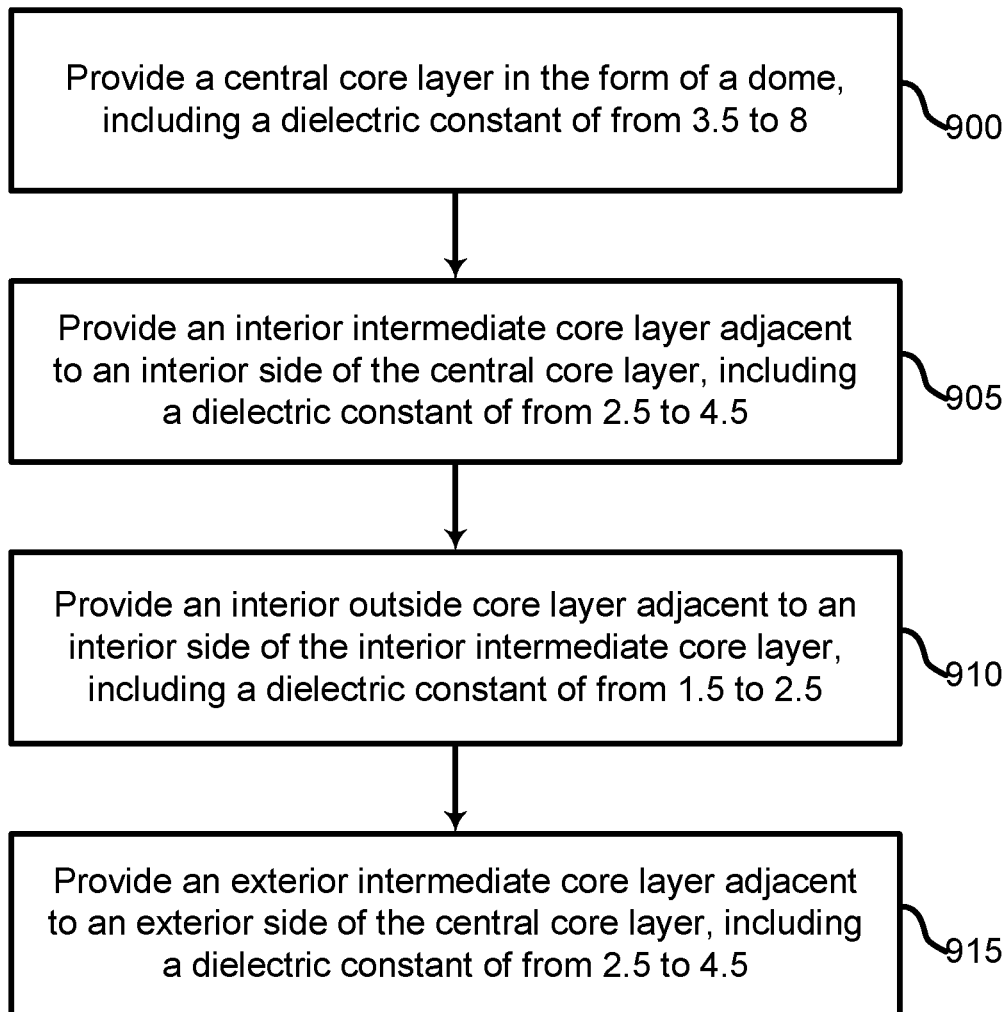

FIG. 9 shows an example of a process for manufacturing a multilayered broadband radome structure in accordance with aspects of the present disclosure. Generally, these operations may be performed according to the methods and processes described in accordance with aspects of the present disclosure. For example, the operations may be composed of various substeps, or may be performed in conjunction with other operations described herein.

At step 900, the system may provide a central core layer in the form of a dome, including a dielectric constant of from 3.5 to 8. In some cases, the operations of this step may refer to a central core layer as described with reference to FIGS. 4-6.

At step 905, the system may provide an interior intermediate core layer adjacent to an interior side of the central core layer, including a dielectric constant of from 2.5 to 4.5. In some cases, the operations of this step may refer to an interior intermediate core layer as described with reference to FIGS. 4-6.

At step 910, the system may provide an interior outside core layer adjacent to an interior side of the interior intermediate core layer, including a dielectric constant of from 1.5 to 2.5. In some cases, the operations of this step may refer to an interior outside core layer as described with reference to FIGS. 4-6.

At step 915, the system may provide an exterior intermediate core layer adjacent to an exterior side of the central core layer, including a dielectric constant of from 2.5 to 4.5. In some cases, the operations of this step may refer to an exterior intermediate core layer as described with reference to FIGS. 4-6.

While the invention herein disclosed has been described by means of specific embodiments, examples and applications thereof, numerous modifications and variations could be made thereto by those skilled in the art without departing from the scope of the invention set forth in the claims.

What is claimed is:

1. A radome structure comprising:
a central core layer comprising a first dielectric constant;
an interior intermediate core layer adjacent to an interior side of the central core layer, comprising a second dielectric constant less than the first dielectric constant;
an exterior intermediate core layer adjacent to an exterior side of the central core layer, comprising a third dielectric constant less than the first dielectric constant;
an interior outside core layer adjacent to an interior side of the interior intermediate core layer, comprising a fourth dielectric constant less than the second dielectric constant; and
an exterior outside core layer adjacent to an exterior side of the exterior intermediate core layer, comprising a fifth dielectric constant less than the third dielectric constant.

2. The radome structure of claim 1, wherein:
the central core layer, interior intermediate core layer, and exterior intermediate core layer comprises woven fiber cloth impregnated with a matrix binder.

3. The radome structure of claim 2, wherein:
the woven fiber cloth is selected from the group consisting of Astroquartz, E-glass, S-glass, polyethylene, polyamide fibers and combinations thereof.

4. The radome structure of claim 2, wherein:
the matrix binder is selected from the group consisting of cyanate ester, epoxy, vinyl ester, polyester, and combinations thereof.

5. The radome structure of claim 1, wherein:
the interior outside core layer comprises syntactic foam formulated with a mixture of microballoons and fillers embedded in a thermoset or thermoplastic matrix binder to achieve the second dielectric constant.

6. The radome structure of claim 1, wherein:
the central core layer comprises syntactic foam formulated with a mixture of microballoons and fillers embedded in a thermoset or thermoplastic matrix binder to achieve the first dielectric constant, and a thickness; and
the interior intermediate core layer comprises syntactic foam formulated with a mixture of microballoons and fillers embedded in said matrix binder to achieve the second dielectric constant, and wherein the exterior intermediate core layer comprises syntactic foam formulated with a mixture of microballoons and fillers embedded in said matrix binder to achieve the third dielectric constant.

7. The radome structure of claim 6, wherein:
the central core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance;
the interior intermediate core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance; and
the exterior intermediate core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance.

8. The radome structure of claim 1, wherein:
said central core layer comprises a dielectric constant of from about 3.5 to 8.5; said interior intermediate core layer comprises a dielectric constant of from about 2.5 to 4.5; said exterior intermediate core layer comprises a dielectric constant of from about 2.5 to 4.5; and said interior outside core layer comprises a dielectric constant of from about 1.5 to 2.5.

9. The radome structure of claim 1, further comprising:
an environmental coating on an exterior surface of the radome structure.

10. The radome structure of claim 1, further comprising:
a protective coating on an interior surface of the radome structure.

11. The radome structure of claim 1, wherein:
the exterior outside core layer has a dielectric constant of from about 1.5 to 2.5.

12. The radome structure of claim 1, wherein:
the interior outside core layer comprises syntactic foam formulated with a mixture of microballoons and fillers embedded in a thermoset or thermoplastic matrix binder to achieve a prescribed dielectric constant and thickness.

13. The radome structure of claim 1, further comprising:
an environmental coating on an exterior surface of the radome structure.

14. The radome structure of claim 1, wherein:
the interior outside core layer comprises a thickness of at least 0.02" and no more than 0.5"; the interior intermediate core layer comprises a thickness of at least 0.005" and no more than 0.5";
the exterior intermediate core layer comprises a thickness of at least 0.005" and no more than 0.5"; and
the central core layer comprises a thickness of at least 0.005" and no more than 0.5".

15. A method of manufacturing a radome structure, the method comprising:
providing a central core layer comprising a first dielectric constant;

providing an interior intermediate core layer adjacent to an interior side of the central core layer, comprising a second dielectric constant less than the first dielectric constant;

providing an exterior intermediate core layer adjacent to an exterior side of the central core layer, comprising a third dielectric constant less than the first dielectric constant;

providing an interior outside core layer adjacent to an interior side of the interior intermediate core layer, comprising a fourth dielectric constant less than the second dielectric constant; and providing an exterior outside core layer adjacent to an exterior side of the exterior intermediate core layer, comprising a fifth dielectric constant less than the third dielectric constant.

16. The method of claim 15, wherein:
the central core layer and interior intermediate core layer comprises woven fiber cloth impregnated with a matrix binder.

17. The method of claim 16, wherein:
the woven fiber cloth is selected from the group consisting of Astroquartz, E-glass, S-glass, polyethylene, polyamide fibers and combinations thereof.

18. The method of claim 16, wherein:
the matrix binder is selected from the group consisting of cyanate ester, epoxy, vinyl ester, polyester, and combinations thereof.

19. The method of claim 15, wherein:
the interior outside core layer comprises syntactic foam formulated with a mixture of microballoons and fillers embedded in a thermoset or thermoplastic matrix binder to achieve the second dielectric constant, and a thickness.

20. The method of claim 15, wherein:
the central core layer comprises syntactic foam formulated with a mixture of microballoons and fillers embedded in a thermoset or thermoplastic matrix binder to achieve the first dielectric constant, and a thickness; and
the interior intermediate core layer comprises syntactic foam formulated with a mixture of microballoons and fillers embedded in said matrix binder to achieve the second dielectric constant, and wherein the exterior intermediate core layer comprises syntactic foam formulated with a mixture of microballoons and fillers embedded in said matrix binder to achieve the third dielectric constant.

21. The method of claim 20, wherein:
the central core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance;

the interior intermediate core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance; and the exterior intermediate core layer comprises a thin layer of dielectrically matched woven fiber and matrix binder juxtaposed with the syntactic foam, wherein the woven fiber and matrix binder form a barrier between one or more syntactic layers to achieve a tailored balance of structural reinforcement and tuned electromagnetic performance.

22. The method of claim 15, wherein:
said central core layer comprises a dielectric constant of from about 3.5 to 8.5; said interior intermediate core layer comprises a dielectric constant of from about 2.5 to 4.5; said exterior intermediate core layer comprises a dielectric constant of from about 2.5 to 4.5; and said interior outside core layer comprises a dielectric constant of from about 1.5 to 2.5.

23. The method of claim 15, the method further comprising:
providing an environmental coating on an exterior surface of the radome structure.

24. The method of claim 15, the method further comprising:
providing a protective coating on an interior surface of the radome structure.

25. The method of claim 15, wherein:
the exterior outside core layer has a dielectric constant of from about 1.5 to 2.5.

26. The method of claim 15, wherein:
the interior outside core layer comprises syntactic foam formulated with a mixture of microballoons and fillers embedded in a thermoset or thermoplastic matrix binder to achieve a prescribed dielectric constant and thickness.

27. The method of claim 15, the method further comprising:
providing an environmental coating on an exterior surface of the radome structure.

28. The method of claim 15, wherein:
the interior outside core layer comprises a thickness of at least 0.02" and no more than 0.5"; the interior intermediate core layer comprises a thickness of at least 0.005" and no more than 0.5";
the exterior intermediate core layer comprises a thickness of at least 0.005" and no more than 0.5"; and
the central core layer comprises a thickness of at least 0.005" and no more than 0.5".

* * * * *